Oct. 11, 1955
W. F. WOLFF ET AL
2,720,547
PREPARATION OF ETHERS
Filed June 20, 1951
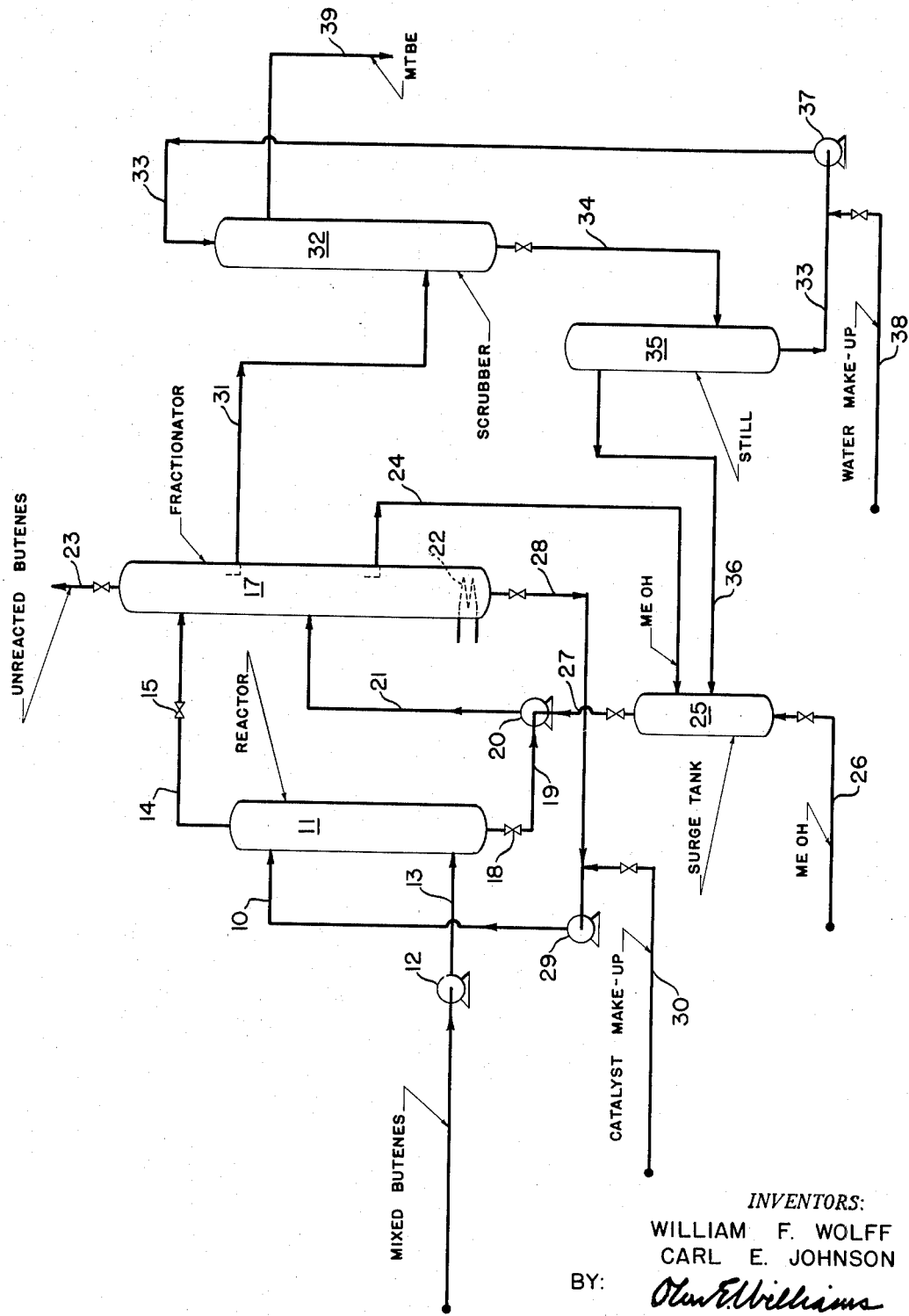
INVENTORS:
WILLIAM F. WOLFF
CARL E. JOHNSON
BY:
ATTORNEY:

United States Patent Office 2,720,547
Patented Oct. 11, 1955

2,720,547
PREPARATION OF ETHERS

William F. Wolff, Park Forest, Ill., and Carl E. Johnson, Griffith, Ind., assignors to Standard Oil Company, Chicago, Ill., a corporation of Indiana Application June 20, 1951, Serial No. 232,526

8 Claims. (Cl. 260—614)

This invention relates to a process of preparing alkyl ethers and has more particular reference to the preparation of ethers from an olefin and an alcohol in the presence of an acid catalyst.

The preparation of ethers from olefins and alcohols in the presence of an acid catalyst is known although low yields and prolonged reaction times are the rule. The prepared ether is recovered from the reaction mixture by distillation after the acid catalyst has been neutralized or otherwise removed. In order to avoid decomposition of the ether, it is essential that the acid catalyst be excluded from the reaction mixture before the said distillation. This instability of the ethers in the presence of acid is noted in the article, Tertiary Alkyl Ethers by Evans et al. in Industrial and Engineering Chemistry, 28, page 1187.

An object of the present invention is to provide improvement in the preparation of alkyl ethers from olefins and alcohols. Another object of the invention is to increase the reaction rate between olefins and alcohols. Yet another object of the invention is the provision of an improved process whereby a product of improved yield and purity is obtained. Still another object of the invention is the provision of a method for the preparation and recovery of ethers from reaction mixtures without the necessity of destroying or otherwise consuming the acid catalyst used in the process. The invention has for other objects such other advantages or results as may be found to obtain in the application or in the claims hereinafter made.

We have found that the foregoing objects can be accomplished in the preparation of ethers from olefins and alcohols by employing a large concentration of the catalytic acid, such concentration of acid being between about ½ mol and 10 mols of catalyst per mol of alcohol. Higher concentrations of acid than these tend to introduce undesirable polymerization of the olefin whereas lower concentrations than the above low limit of about ½ mol of catalyst cause one to encounter undesirably slow reaction rates. These acid concentrations, considerably higher then one would expect to be useful when a catalyst is employed, not only increase the reaction rate but also affect the production of an ether of improved purity and yield, presumably because the increased reaction rate permits the establishment of the reaction equilibrium rapidly enough to prevent, to any substantial degree, undesirable side reactions. We have found that these high acid concentrations can be employed effectively without promoting undesirable side reactions only when the acid strength is limited to about the acidity of a concentrated alkane sulfonic acid, as hereinafter defined in greater detail.

Such large quantities of acid could not be employed economically in the process, however, if this feature were not combined with a provision for the separation of ether product from the remaining reaction mixture, without the necessity of destroying or diluting this large concentration of acid catalyst. To furnish fresh acid for each batch of alcohol and olefinic product or to reconcentrate a highly diluted acid when such large quantities of acid are employed would obviously render the process infeasible. Therefore, in addition to the employment of high concentrations of acid, we provide for the separation of the prepared ether from the acid without destruction or dilution of the acid.

This separation process comprises adding to the reaction product before separation of the ether by distillation, at least one-half a mol of an alcohol per mol of the produced ether in excess of that amount of alcohol which will produce an azeotrope with the ether. After addition of this excess of alcohol the prepared ether can be distilled directly from the reaction mixture without destruction or dilution of the acid constituent. The added alcohol is preferably the same as that employed in the etherification reaction so that, after separation of product ether, the excess alcohol can be returned with the catalyst acid to the etherification step. Excess alcohol can also be returned to the distillation zone itself for further employment in the prevention of the decomposition of the alkyl ether.

The etherification reaction can be performed readily at temperatures between about —50° and +50° C. and preferably at temperatures between about —10° and +30° C. Room temperature is usually suitable and is generally more economical. Increasing the temperature above about 50° C. will tend to cause polymerization of the reactant olefin. On the other hand, even with secondary alcohols it is unnecessary to go below 0° C. in order to prevent the formation of any by-product.

Tertiary olefins having less than 8 carbon atoms per molecule are suitable in the process. They can be derived from several sources, such for example, as the distilling or cracking of petroleum or petroleum products and the destructive hydrogenation of carbonaceous materials. Preferred tertiary olefins are those having from 4 to 6 carbon atoms per molecule. Isobutylene, for example, can be employed in the preparation of methyl tertiary butyl ether, an effective anti-knock agent. Since the process is selective for tertiary olefins, liquids or gases containing tertiary olefins can be employed as feed stock as well as pure olefins.

Alcohols that have a hydroxyl radical attached to a non-tertiary carbon atom, that form low-boiling azeotropes with the prepared ethers, and that preferably are sufficiently water soluble to permit their removal from the azeotropic mixture by water washing, are suitable for the preparation of ethers by the process of the invention. Either primary or secondary low molecular weight alcohols having less than about 8 carbon atoms per molecule are suitable. Primary alcohols are preferred and appear to be somewhat more reactive than secondary alcohols.

The acid, which is employed as a catalyst in the process of invention, is essentially an acid having an acid strength substantially equivalent to that of an alkanesulfonic acid having less than about 6 carbon atoms per molecule and a concentration greater than 90 percent and preferably between about 90 and 96 weight percent; it is employed in relative amounts from ½ mol to as high as 10 mols of acid per mol of alcohol. Examples of such acids are alkane and aryl sulfonic acids, a diluted sulfuric acid (between about 70 and 80 percent concentration) and phosphoric acid. Preferred acids in this process are the aryl and alkane sulfonic acids having less than about 14 carbon atoms per molecule. These include methane-, ethane-, propane-, butane-, and hexanesulfonic acids or mixtures of such alkane sulfonic acids and benzene-, xylene-, naphthalene-, and alkyl-naphthalene-sulfonic acids of the aryl sulfonic acids. Preferred alkane sulfonic acids are those having between 1 and 5 carbon atoms per molecule, inclusive.

Between 0.5 and 30 mols, and, preferably, between 1 and 10 mols, of excess alcohol per mol of ether should be added to the crude reaction products to permit distillation of the ether in the presence of catalyst acid.

In the accompanying drawing, supplied only for the purpose of illustrating the present invention, the single figure is a flow diagram showing schematically a process for the continuous production of methyl tertiary butyl ether.

Referring now to the drawing, a mixture of methanol and mixed alkane sulfonic acids having an average number of carbon atoms per molecule of about two and containing primarily methane-, ethane-, and propanesulfonic acids is introduced through a line 10 into a reactor 11, which consists of a column filled with a suitable packing. The methanol and acid, preferably present in a ratio of about three mols of methanol to two mols of acid catalyst, is introduced into the upper section of packed tower 11 and flows down over the packing contained therein. A mixed stream of butenes containing isobutylene is pumped by blower 12 through a line 13 into the base of reactor tower 11. Preferably about one mol of isobutylene is introduced into the tower per mol of introduced methanol. The rising isobutylene comes in countercurrent contact with the methanol-acid mixture at temperatures maintained between about $-30°$ and $+50°$ C. and preferably at about room temperature. Isobutylene and methanol react in the presence of the acid to form methyl tertiary butyl ether. Unreacted butenes flow from reactor 11 through a line 14 and are discharged through a valve 15 into the upper section of fractionating column 17. The reaction product in reactor 11 settles to the bottom of the reactor as a single homogeneous liquid phase and is withdrawn from reactor 11 through a valve 18 in line 19.

The reaction product which consists of methyl tertiary butyl ether, catalyst acid and traces of unreacted methanol is mixed in a mixing pump 20 with an amount of methanol in excess of the quantity necessary to form an azeotrope with the ether. The reaction product and excess alcohol are pumped through line 21 by pump 20 into fractionating column 17 at an intermediate point in the column and upon a tray disposed therein.

Fractionating column 17, equipped with a re-boiler 22, effects a fractionation of the reaction products. Any product ethers that have been carried from the reactor in the butene stream are separated from the butenes in fractionator 17. Unreacted butenes are released through a valved discharge line 23. Excess methanol that is separated in the said fractionating column flows therefrom through line 24 and is introduced into a collecting or surge tank 25 into which is also directed make-up methanol through line 26. Methanol from surge tank 25 is withdrawn through valved line 27 by mixer pump 20 in which methanol is mixed with reaction product.

Mixed alkane sulfonic acid and a portion of the excess methanol are withdrawn from the fractionating column 17 through valved line 28 and are delivered by a pump 29 into line 10 and thence into reactor 11. Catalyst make-up is delivered through valved line 30 into line 28 upstream from the pump 29. Make-up methanol can also be delivered, by means not shown, into line 28 and be introduced into reactor 11 through line 10.

An azeotrope of methanol and methyl tertiary butyl ether is distilled from the reaction product in fractionating column 17. The azeotrope is passed through line 31 and is introduced into a scrubber-condenser 32 in which the azeotrope is condensed by direct contact with cooling water. The cooling water is introduced into the top of scrubber 32 through line 33 and in passing down through the scrubber dissolves the methanol from the condensate. This aqueous solution of methanol is withdrawn from scrubber 32 and flows through valved line 34 into a still 35 in which the methanol is concentrated. Methanol from still 35 is passed through line 36 into surge tank 25. Water from the still 35 can be pumped by pump 37 through line 33 back into scrubber 32. Make-up water is introduced through line 38 at a point in line 33 just preceding pump 37.

Methyl tertiary butyl ether from which methanol has been removed by the water wash is decanted from the scrubber 32 and is delivered therefrom through line 39 to any preferred refining, storage, or utilization equipment.

The following examples are presented for the purposes of illustrating the invention and comparing the results of our process with those obtained when no excess of alcohol is added, when an insufficient quantity of acid is employed, and when too strong an acid is used.

*Example I*

In this example liquid isobutylene was reacted with methanol in the presence of mixed alkane sulfonic acid.

To a reactor equipped with a stirrer, fitted with a reflux column, and cooled with a mixture of Dry Ice and acetone, there was added a mixture of 3.03 mols of methanol and 2.0 mols of mixed alkane sulfonic acids. The temperature was maintained during the mixing at about $-20°$ C. Thereafter 3.07 mols of liquid isobutylene were added to this solution and the mixture was stirred while maintaining the temperature at $-18°$ C. to $+20°$ C. for a period of about four hours, at the end of which time a single phase system was obtained. The temperature of the mixture was then held below 26° C. by means of external cooling. About 160 grams of methanol were added to the single phase reaction product after it had stood for some time. The mixture was then distilled at atmospheric pressure until a still temperature of 101° C. and an overhead temperature of 66° C. were reached. The distillate was washed with water and a yield of 237.5 grams, or 88 percent of theoretical, of methyl tertiary butyl ether was obtained. Importantly, no evidence of any by-product formation was observed.

*Example II*

In this example, the catalyst employed in the preceding example was used again to determine whether or not this catalyst could be recycled or reused without substantial decrease in its activity.

To the catalyst and excess alcohol recovered from the distillation in the preceding example, which mixture weighed 294.5 grams, there were added 22 grams of additional methanol. The resulting solution was maintained at a temperature of about $-19°$ C. while 170.5 grams of liquid isobutylene were added thereto. The temperature was thereafter allowed to rise from $-19°$ C. to $+22°$ C. while the mixture was stirred under a Dry Ice-acetone knock-back over a period of about five hours. At the end of this time a single phase system was obtained. Thereafter the temperature of the mixture was held below $+23°$ C. by external cooling. After the product stood for some time, about 215 grams of methanol were added to the clear, single phase product. The resulting solution was distilled at atmospheric pressure until a still temperature of 100° C. and an overhead temperature of 65.5° C. were reached. The distillate was water washed and the organic product was separated from the wash water. A total of 243.5 grams or a 91 percent conversion to methyl tertiary butyl ether was obtained. Here again no evidence of any by-product formation was observed.

*Example III*

In this example, the reactant olefin was introduced into the reaction mixture in the form of a gas.

To the reactor, in this instance fitted with a gas dispersion inlet tube, there was added a mixture of 3.06 mols of methanol and 2.0 gram mols of mixed alkane sulfonic acids at a temperature of 19° C. Isobutylene was passed as a gas into this solution with vigorous stirring over a period of 6¾ hours. During this period, the temperature of the mixture rose to about 37° C. and was still rising when introduction of isobutylene was discontinued.

A total amount of 2.3 mols of isobutylene was so introduced. After the product, a clear, single phase liquid, had been permitted to stand at room temperature for over ten hours, about 120 grams of methanol were added thereto. This product solution was then distilled at atmospheric pressure until a still temperature of 88° C. and an overhead temperature of 66° C. were reached. A water-washed distillate consisting of 179 grams of methyl tertiary butyl ether, or 89 percent conversion of isobutylene to ether, was obtained. Yet again no evidence whatsoever of any by-product formation was observed.

*Example IV*

In this example a secondary alcohol was employed.

Isobutylene was passed into a stirred mixture containing 4.5 gram mols of mixed alkane sulfonic acids having an average number of carbon atoms per molecule of about 2 and 4.5 gram mols isopropyl alcohol while maintaining the temperature of the reaction zone between 10° C. and 16° C. The reaction was continued until 4.5 gram mols of the olefin had been absorbed.

Isopropyl tertiary butyl ether such as produced by the above run was distilled at reduced pressure and still temperatures below 30° C. in the presence of mixed alkane sulfonic acids and an amount of isopropyl alcohol in excess of that required to form an azeotropic mixture with the ether. The isopropyl alcohol, which came over as part of the distillate, was removed from the isopropyl tertiary butyl ether component of the distillate by means of a water wash. The ether was almost quantitatively recovered without any evidence of by-product formation.

When, on the other hand, the crude reaction product was processed by dumping it into water and distilling the water insoluble phase, a yield of only 34% ether was obtained.

*Example V*

This example demonstrates the fact that the employment merely of an excess of alcohol from the beginning of the reaction will not solve the problem of low ether yield, for when such excess is initially added the acid concentration will be so reduced that a prolonged reaction time will be required.

A reactor that was equipped with stirring apparatus and with a reflux column employing a Dry Ice and acetone cooling mixture was used and to this reactor 3.0 gram mols of methanol and 1.0 gram mol of mixed alkane sulfonic acids were added. The temperature during the admixture was maintained at about −20° C. Thereafter 3.13 gram mols of liquid isobutylene were added to the solution which was stirred and maintained at a temperature of −14° C. to −1.2° C. for a period of about 10¼ hours, at the end of which time the unreacted isobutylene was allowed to boil off and the reactor contents were warmed up to room temperature. This product, a clear single phase liquid, containing 0.72 gram mol of isobutylene, was allowed to stand for a considerable period and was then distilled at atmospheric pressure until the still temperature reached 101.5° C. and the overhead temperature 65° C.

A water washed distillate consisting of 58.4 grams of methyl tertiary butyl ether was obtained. Even though a prolonged reaction period of over 10 hours was employed, the yield was only 21 mol percent based on the isobutylene originally charged.

*Example VI*

To 32 cc. of mixed alkanesulfonic acids were added 16 cc. of the azeotrope obtained by distilling a mixture of methanol and methyl tertiary butyl ether at atmospheric pressure. An attempt was then made to distill this azeotrope from the acid without adding additional methanol. The still pot was heated to a temperature of 107° C. at atmospheric pressure but no appreciable amount of distillate came overhead. At this point it was noted that the pot contents had separated into two distinct layers. These pot contents were then dumped into water to obtain about 6½ cc. of water insoluble butylene polymer ($N_D^{20}=1.4291$). The results obtained in this example indicate that an amount of methanol in excess of that required to form an azeotrope with the ether, i. e., about one part of methanol for four parts of methyl tertiary butyl ether to form the azeotrope, is required in order to obtain a satisfactory separation of the products by distillation.

*Example VII*

In this example an aryl sulfonic acid was used as the catalyst.

To a stirred reactor equipped with a reflux condenser that was cooled with a Dry Ice-acetone mixture, there were added 3.06 mols of methanol and 2.0 mols of technical para toluene sulfonic acid, while the temperature was maintained at −17° C. Thereafter 3.05 mols of liquid isobutylene were added to the solution and the mixture was stirred at a reaction temperature of −16° C. to +7° C. for a period of about one hour, at the end of which time a single liquid phase was obtained. The temperature of the mixture was then held below 29° C. by means of external cooling, and about 160 grams of methanol were added to the reactor contents. The reaction mixture was distilled at atmospheric pressure until a still temperature of 101° C. and an overhead temperature of 61° C. were reached. The distillate product was washed with water to give 236 grams of methyl tertiary butyl ether, which is an 88 percent conversion of isobutylene to ether. Once again no evidence of any by-product formation was observed. The results indicate that aryl sulfonic acids may be used as catalyst for our process.

*Example VIII*

In this example a diluted sulfuric acid was employed as the etherification catalyst.

A reaction vessel equipped with stirring apparatus was charged with a mixture consisting of 3 mols of methanol and 2 mols of 80 percent sulfuric acid. The refluxing column was connected with the reaction vessel and was cooled with a mixture of Dry Ice and acetone. There was then introduced 3.04 mols of liquid isobutylene which was stirred into the reaction mixture. The temperature was maintained within the range of about −10° to +16° C. for a period of one hour and 50 minutes, at the end of which time the reaction mixture appeared as a single liquid phase, thus indicating that the reaction was completed. The reaction mixture was then permitted to warm gradually to room temperature, at which temperature the reactor contents still existed as a single liquid phase. To this reaction product 200 cc. of methanol were added and the mixture was distilled at atmospheric pressure until a still temperature of 102° C. and an overhead temperature of 75° C. were reached. The distillate was washed with water to provide a product consisting of 223 grams of crude methyl tertiary butyl ether, this representing an 84 percent conversion of the isobutylene to the ether.

*Example IX*

In this example an attempt was made to employ concentrated sulfuric acid.

To the stirred reactor fitted with the said reflux column and cooling system there was added a solution containing 3.0 mols of methanol and 2.0 mols of concentrated sulfuric acid, that is, about 96% acid, while the temperature was maintained at −21° C. Thereafter 3.07 mols of liquid isobutylene were added to this solution and were mixed thoroughly therewith for a period of 6¼ hours while the temperature rose from −18° to 14.5° C. At the end of the reaction period a single phase liquid product was obtained. However, in this instance the single phase system was not stable and when the reactor contents were allowed to stand overnight at room temperature the product separated into two liquid phases. Approximately 160 grams of methanol were added to this product and the mixture was distilled at atmospheric pressure until the still temperature reached 85° C. and the overhead temperature reached 67° C. The washed distillate yielded 130 grams of methyl tertiary butyl ether, representing a 49 percent conversion of isobutylene and in addition, 65 grams of a butylene polymer were recovered from the still residue. It can be observed from this example that when the attempt is made to use concentrated sulfuric acid under the same conditions that are applicable to alkane sulfonic acids a degradation of yield and product is encountered.

The foregoing examples clearly illustrate an essential feature of the present invention, and that is the fact that in processing the reaction products an excess of alcohol over and above that required to azeotrope with the so-produced ether is essential to the recovery of high yields of ether with substantially no by-product formation. The importance of the latter is clear, especially with respect to obtaining products of relatively high purity and permitting recycle of unconverted reactants.

It is preferred to employ, in the separation of the ether from the reaction mass, the same alcohol as that employed in preparing the ether. Employment of the same alcohol is essential when distillation residue containing catalyst acid and excess alcohol is recycled to the reaction zone. For ease of separation from the azeotrope, it is preferred that the employed alcohol be water soluble so that it can be washed out of the azeotrope with water. Other means of separating compounds, e. g., fractional crystallization, can be employed with the heavier alcohols.

All of the distillations reported in the foregoing specific examples were performed at atmospheric pressure, which is the preferred pressure for both the etherification reaction and the distillation step. However, pressures higher than atmospheric can be imposed on the reaction zone to keep the employed tertiary olefin in liquid phase, and pressures less than atmospheric can be employed in distilling the azeotrope product. This latter expedient may permit the employment of less excess alcohol but is not as effective as the simple use of additional quantities of excess alcohol.

Methyl tertiary butyl ether is a well-known anti-knock agent or high octane blending agent; other ethers such, for example, as ethyl tertiary amyl ether and the tertiary butyl isopropyl ether produced in Example IV, are useful particularly as solvents, azeotroping agents and fuel additives.

Having described our invention, we claim:

1. A process for the preparation of an ether, which process comprises contacting a tertiary olefinic hydrocarbon having less than 8 carbon atoms per molecule with a non-tertiary aliphatic alcohol having not more than 8 carbon atoms per molecule in the presence of about 0.5 to about 10 mols per mol of said alcohol of an acid catalyst having an acid strength equivalent to that of an alkanesulfonic acid having less than 6 carbon atoms per molecule and a concentration greater than 90 weight percent at an etherification reaction temperature between about −50° C. and about +50° C., thereafter adding to the reaction product an alcohol of the class hereinabove specified in a proportion of at least about 0.5 mol per mol of produced ether in excess of the amount of said alcohol required to produce an azeotrope with said ether, and distilling an ether-alcohol azeotrope from the product mixture.

2. A process for the preparation of an ether, which process comprises contacting a tertiary olefinic hydrocarbon having less than 8 carbon atoms per molecule with a non-tertiary aliphatic alcohol having not more than 8 carbon atoms per molecule in the presence of about 0.5 to about 10 mols per mol of said alcohol of an acid catalyst selected from the class consisting of hydrocarbon sulfonic acids having not more than about 14 carbon atoms per molecule and aqueous sulfuric acid having a sulfuric acid concentration between about 70 weight percent and about 80 weight percent at an etherification reaction temperature between about −50° C. and about +50° C., thereafter adding to the reaction product an alcohol of the class hereinabove specified in a proportion of at least about 0.5 mol per mol of produced ether in excess of the amount of said alcohol required to produce an azeotrope with said ether, and distilling an ether-alcohol azeotrope from the product mixture.

3. A process for the preparation of an ether, which process comprises contacting a tertiary olefinic hydrocarbon having less than 8 carbon atoms per molecule with a non-tertiary aliphatic alcohol having not more than 8 carbon atoms per molecule in the presence of about 0.5 to about 10 mols per mol of said alcohol of an acid catalyst which is a hydrocarbon sulfonic acid having not more than about 14 carbon atoms per molecule at an etherification reaction temperature between about −50° C. and about +50° C., thereafter adding to the reaction product an alcohol of the class hereinabove specified in a proportion of at least about 0.5 mol per mol of produced ether in excess of the amount of said alcohol required to produce an azeotrope with said ether, and distilling an ether-alcohol azeotrope from the product mixture.

4. A process for the preparation of an ether, which process comprises contacting a tertiary olefinic hydrocarbon having less than 8 carbon atoms per molecule with a non-tertiary aliphatic alcohol having not more than 8 carbon atoms per molecule in the presence of about 0.5 to about 10 mols per mol of said alcohol of an acid catalyst which is aqueous sulfuric acid having a sulfuric acid concentration between about 70 weight percent and about 80 weight percent at an etherification reaction temperature between about −50° C. and about +50° C., thereafter adding to the reaction product an alcohol of the class hereinabove specified in a proportion of at least about 0.5 mol per mol of produced ether in excess of the amount of said alcohol required to produce an azeotrope with said ether, and distilling an ether-alcohol azeotrope from the product mixture.

5. A process for the preparation of methyl tertiary butyl ether, which process comprises contacting isobutylene with methanol in the presence of about 0.5 to about 10 mols per mol of methanol of an alkanesulfonic acid having not more than 5 carbon atoms per molecule and a concentration of at least about 90 weight percent at a reaction temperature between about −50° C. and about +50° C., thereby producing a single liquid phase, thereafter adding methanol to the single liquid phase reaction product in a proportion of at least about 0.5 mol per mol of produced methyl tertiary butyl ether in excess of the amount of methanol which is required to produce an azeotrope with said ether, and distilling said azeotrope from the reaction mixture.

6. A process for the preparation of methyl tertiary butyl ether, which process comprises contacting isobutylene with methanol in the presence of about 0.5 to about 10 mols per mol of methanol of a toluenesulfonic acid at a reaction temperature between about −50° C. and about +50° C., thereby producing a single liquid phase, thereafter adding methanol to the single liquid phase reaction product in a proportion of at least about 0.5 mol per mol of produced methyl tertiary butyl ether in excess of the amount of methanol which is required to produce an azeotrope with said ether, and distilling said azeotrope from the reaction mixture.

7. A process for the preparation of methyl tertiary butyl ether, which process comprises contacting isobutylene with methanol in the presence of about 0.5 to about 10 mols per mol of methanol of an aqueous sulfuric acid having a sulfuric acid concentration between about 70 weight percent and about 80 weight percent at a reaction temperature between about −50° C. and about +50° C., thereby producing a single liquid phase, thereafter adding methanol to the single liquid phase reaction product in a proportion of at least about 0.5 mol per mol of produced methyl tertiary butyl ether in excess of the amount of methanol which is required to produce an azeotrope with said ether, and distilling said azeotrope from the reaction mixture.

8. A process for the preparation of isopropyl tertiary butyl ether, which process comprises contacting isopropanol with isobutylene in the presence of about 0.5 to about 10 mols per mol of methanol of an alkanesulfonic acid having not more than 5 carbon atoms per molecule and a concentration greater than 90 weight percent at a reaction temperature between about —50° C. and about +50° C., thereafter adding to the reaction product at least 0.5 mol of isopropanol per mol of produced ether in excess of the amount of isopropanol required to produce an azeotrope with said ether, and distilling said azeotrope from the product mixture.

References Cited in the file of this patent

UNITED STATES PATENTS

| | | |
|---|---|---|
| 1,968,601 | Edlund et al. | July 31, 1934 |
| 2,489,619 | Carlson et al. | Nov. 29, 1949 |